March 12, 1963  E. H. PIGNONE  3,080,658
INSTRUMENT FOR LOCATING RADII OF LINES TANGENT
TO RIGHT ANGULARLY RELATED LINES
Filed Feb. 25, 1958
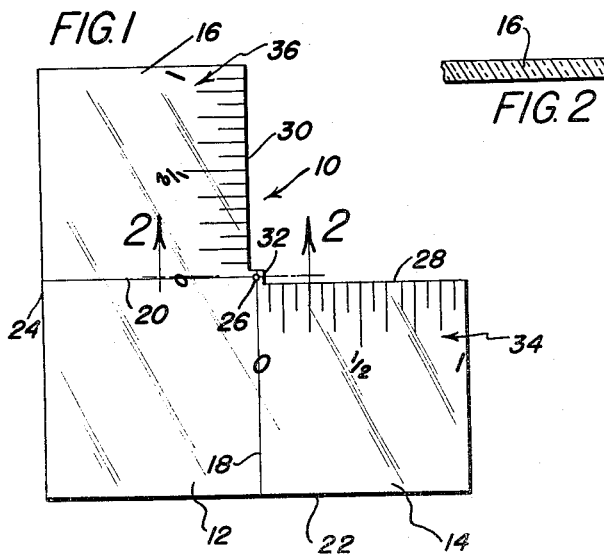
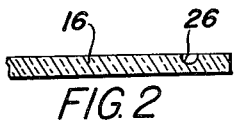
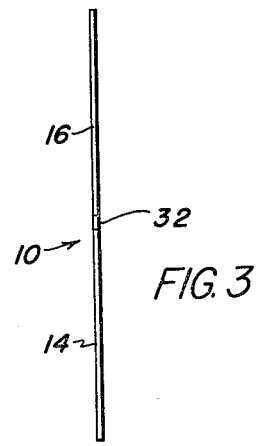
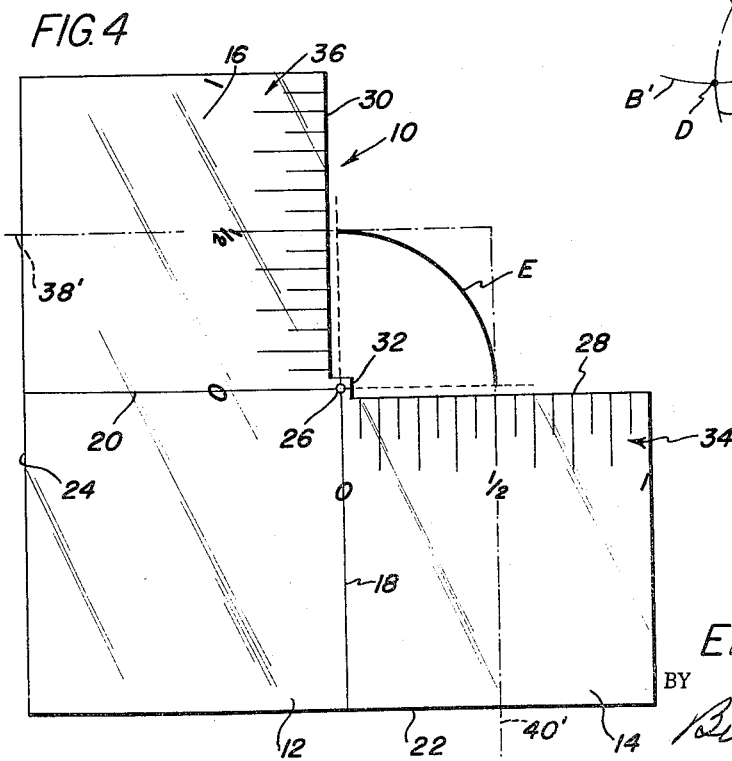
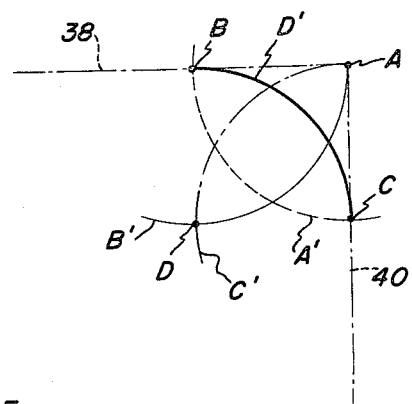
INVENTOR.
EDWARD H. PIGNONE
BY
ATTORNEY

United States Patent Office 3,080,658
Patented Mar. 12, 1963

3,080,658
INSTRUMENT FOR LOCATING RADII OF LINES TANGENT TO RIGHT ANGULARLY RELATED LINES
Edward H. Pignone, 19 Eastlick Road, Nixon, N.J.
Filed Feb. 25, 1958, Ser. No. 717,410
1 Claim. (Cl. 33—112)

This invention relates generally to geometrical instruments and is more particularly concerned with an improved instrument usable with a compass and particularly beneficial to draftsmen, for example.

Conventionally, when drawing an arc tangent to two right angularly related lines, a draftsman after knowing the radius of the arc has to measure it off on a graduated scale, and after locating a point equidistant between right angularly related lines and falling on a line bisecting the right angle insert the needle of a compass at this point and scribe the arc. Such a procedure involves several manipulations of the compass, increasing the probability of inaccuracy and error and invariably leaves a mark on the paper where the compass needle has been inserted.

A primary object of this invention is to provide a geometrical instrument which will accurately locate a point for a compass needle for a given radius of an arc to be tangent to a pair of right angularly related lines, the instrument including means protecting the paper upon which the arc will be drawn against damage from the compass needle and including portions which will not interfere with the proper scribing of the tangent, and further will permit the use of an inking compass without the danger of drawing the ink from the inking pen while the arc is being scribed.

Another object of this invention is to provide a geometrical instrument facilitating the locating of different radii of tangents to right angularly related lines, the instrument being readily and economically manufactured, easily used, and accurate and practical for the purpose intended.

More particular objects of the invention will become apparent upon reading the following description of the preferred embodiment, the appended claim and the accompanying drawing, in which:

FIGURE 1 is a plan view of the novel instrument;

FIGURE 2 is an enlarged fragmentary section taken on line 2—2 of FIGURE 1;

FIGURE 3 is an end view looking from right to left at FIGURE 1;

FIGURE 4 is an enlarged plan view of the novel instrument showing the manner in which it may be used to form an arc tangent to two right angularly related lines; and FIGURE 5 is a diagrammatic view illustrating a conventional method of laying out an arc tangent to two right angularly related lines by using a compass.

Referring to the drawing in detail, the novel geometrical instrument is indicated generally at 10 comprising a flat planar body member 12 of any suitable substantially rigid material, a transparent plastic being especially adaptable for this purpose. Body member 12 may be conveniently shaped in the form of a right angle having two flat right angularly related legs 14 and 16. Scribed on the legs 14 and 16 are right angularly related intersecting guide lines 18 and 20, respectively, extending to the respective outer edges 22 and 24 of the body member.

The guide lines 18 and 20 intersect at a punch mark 26 which will receive a compass needle of the compass used to scribe the tangent. The legs 14 and 16 include inner edges 28 and 30 which are offset relative to the punch mark 26, as clearly seen in FIGURE 4, for example. The edges 28 and 30 theoretically intersect at a point falling on a line bisecting the right angular lines to which the tangent is to be drawn. The punch mark 26 is formed in an integral projecting portion 32 of the body member.

Extending from the guide line 18 along the line 28 is an indicia scale indicated generally at 34, laying out this edge of the leg in fractional portions of an inch, the guide line 18 being the "0" reference point. The indicia scale 34 may conveniently include numerical indicia from the guide line 18 reading "0", "½", "1", etc. The instrument disclosed illustrates the legs 14 and 16 as being one inch long, however, any suitable convenient length may be utilized. Extending from the guide line 20 along the edge 30 of leg 16 is a second indicia scale indicated generally at 36, similar to that previously described. The indicia scales are equidistant from the center punch 26.

*Conventional Method*

Referring to FIGURE 5, a pair of right angularly related lines 38 and 40 intersect at point A. If it is desired to lay out a one-half inch radius arc tangent to lines 38 and 40 by means of a compass, a draftsman must first measure one-half inch on a scale. Next the compass needle is placed at point A and an arc is scribed intersecting lines 38 and 40 at points B and C. Next the needle of the compass is inserted at point B, an arc B' is struck. Next the compass needle is inserted at point C and the arc C' is struck intersecting arc B' to locate point D. Finally, the needle of the compass is inserted at point D and an arc D' is struck between points B and C, this being the line tangent to right angularly related lines 38 and 40. It will be observed that approximately five different steps are involved in this procedure, increasing the possibility of error and inaccuracies as well as leaving on the drafting paper marks formed by the needle of the compass.

*Method Involved Using Novel Instrument*

Referring to FIGURE 4, a pair of right angularly related lines are indicated at 38' and 40' and using the instrument 10 it is desired to form an one-half inch radius arc tangent to the intersecting lines. The instrument is laid upon the lines 38' and 40' with the one-half inch numerical indicia of scales 36 and 34, respectively, in alignment with one of the lines. The center punch 26 will automatically fall on a line bisecting the angle between the lines 38' and 40' immediately locating the point for receiving the needle of a compass for scribing the one-half inch radius arc E. This is a two step procedure which leaves the drafting paper in perfect condition since the punch mark 26 will prevent the compass needle from penetrating the drafting paper. The tangent E terminates inwardly at its opposite ends, short of the edges 28 and 30, thus affording the draftsman good visibility positioning the instrument and forming the arc, and permitting him to completely form the arc without moving the instrument 10. Additionally, if the draftsman is using an inking compass, the arc E may be completely formed without the danger of the instrument 10 engaging the inking pen and drawing the ink therefrom beneath the instrument, such accidents occurring oftentimes when using conventional drafting instruments such as a T-square or triangles.

Another use of the novel instrument is that of scribing a series of arcs of the same or different radii by sliding the instrument along a straight edge such as a T-square or the like and forming the arcs at prelocated points.

The construction as shown embodies the invention in a preferred form, but it is intended that the disclosure be illustrative rather than definitive, the invention being defined in the claim.

I claim:

A geometrical instrument for aiding to form a tangent to a pair of right angularly related lines comprising a pair of flat members having inner straight edges disposed perpendicular to one another to form a ninety degree angle therebetween, an integral projection at the juncture of said inner straight edges extending from said edges into the region of said ninety degree angle, an indentation formed in said projection and spaced a short distance from the inner straight edges, and linear measuring scales formed on the surface of the flat members adjacent the inner edges and extending from the indentation.

References Cited in the file of this patent

UNITED STATES PATENTS

| | | |
|---|---|---|
| 183,387 | Essex | Oct. 17, 1876 |
| 452,054 | Sperry | May 12, 1891 |
| 513,665 | Barberie | Jan. 30, 1894 |
| 652,962 | Hill | July 3, 1900 |
| 1,961,500 | Larson | June 5, 1934 |
| 2,437,847 | Zeise | Mar. 16, 1948 |

OTHER REFERENCES

Product Engineering, January 1949, page 172. (Copy in 33–112.)